Aug. 25, 1964
G. H. FRENCH ETAL
3,145,500
FISH OR MINNOW TRAP
Filed April 3, 1961
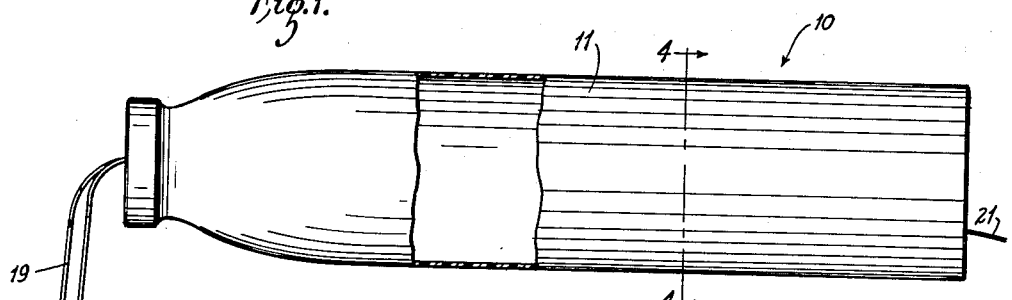
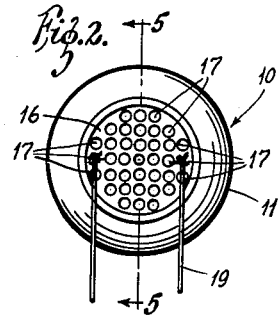
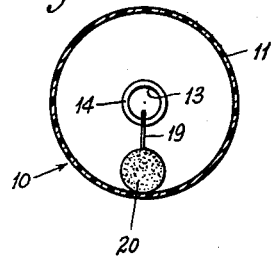
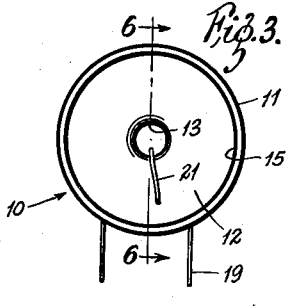
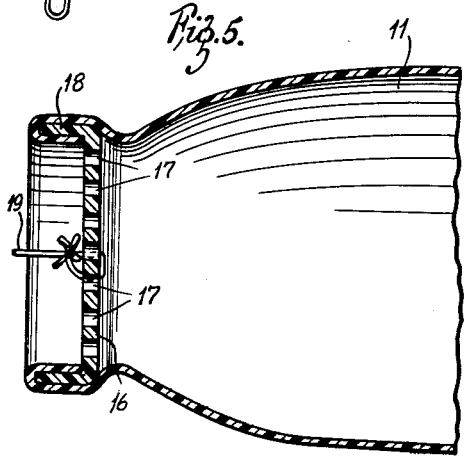
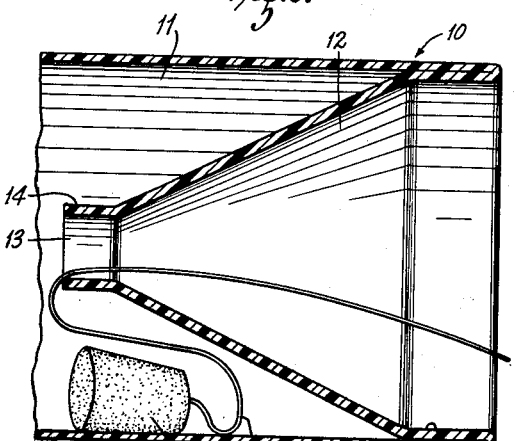
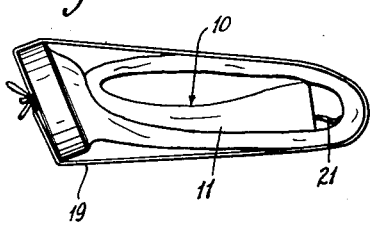
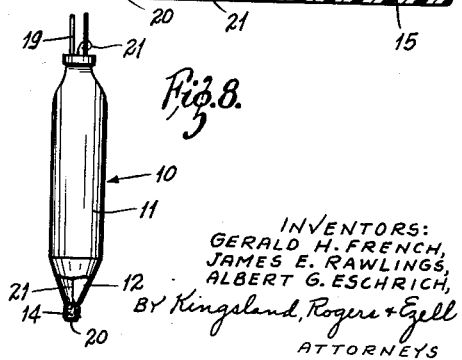
INVENTORS:
GERALD H. FRENCH,
JAMES E. RAWLINGS,
ALBERT G. ESCHRICH,
BY Kingsland, Rogers & Ezell
ATTORNEYS

United States Patent Office 3,145,500
Patented Aug. 25, 1964

3,145,500
FISH OR MINNOW TRAP
Gerald H. French, 9530 Theodosia Ave., Overland, Mo., James E. Rawlings, 9074 Pallardy Lane, Overland, Mo., and Albert G. Eschrich, 838 Teson Ave., Hazelwood, Mo.; said Eschrich assignor of one-sixth to said French and one-sixth to said Rawlings
Filed Apr. 3, 1961, Ser. No. 100,116
1 Claim. (Cl. 43—103)

This invention relates to a fish or minnow trap that can be folded for compact storage and transport and that automatically assumes a correct shape for trapping fish or minnows when submerged under water.

This inveniton is described principally as a minnow trap. In states where the trapping of other fish is permitted, however, this trap may be used. It should, therefore, be recognized that the scope of the invention embraces the trapping of all kinds of fish, as well as minnows.

The trap of this invention is of elongated, tubular form, illustrated as being of cylindrical shape, although other shapes are possible. The side wall of the body is flexible and foldable. One end of the body has a perforated cover for admitting water into the trap, and the other end has a funnel-like minnow passage attached to it. The perforated cover is relatively rigid and the funnel-like passage is relatively rigid, although the funnel-like passage is flexible enough to be invertible between positions extending within and without the tubular body. The funnel-like minnow passage may also be flattened or bent, but it is not as flexible as the side wall of the tubular body.

Minnow traps have been constructed of various materials including celluloid, wire mesh, wood and metal sheet. Such minnow traps usually comprise some form of container through which water can freely flow. One end of the trap is placed downstream. The downstream end has an opening through which minnows can readily swim, but the opening is not conveniently accessible to minnows attempting to swim back out of the container. All of the traps available heretofore, have been constructed with rigid walls or with flexible walls supported by rigid framework so that the traps will maintain their shapes under water pressures and water current pressures.

Therefore, these previous minnow traps, while fairly satisfactory as minnow traps, are extremely bulky in both transport and storage. There are other defects in minnor traps which the present invention corrects, and which render the invention far superior during both use and non-use.

Principal objects of the invention are to provide a fish or minnow trap that can be folded or rolled up for transportation or storage, that will automatically expand when used in swift water, that can be manually expanded when used in still water, and that, in either swift or still water, will remain expanded. Along with these is the object of providing a minnow trap that is extremely compact and light in weight for ease of handling.

Additional objects of the invention are to provide a minnow trap that is readily collapsible for transportation or storage, but that will hold its shape in water, and to provide a collapsible minnow trap that is strong enough to hold trapped water when lifted clear of the body of water.

Another object is to provide a foldable fish or minnow trap that can be used as an expanded trap wherein strings, ribs, springs or other framework are not necessary to maintain the expanded shape of the trap.

Still another object of the invention is to provide a minnow trap that is constructed of a soft material to reduce the harm to minnows captured within the trap as the minnows bombard the walls of the trap in their attempts to escape from it.

Another object of the invention is to provide a minnow or fish trap that is formed with thin flexible walls wherein the weight of water displaced by the walls is such that the upper walls will tend to remain suspended above the lower walls thereby preventing collapsing of the trap, even in still water; or at least the upper walls of the trap will remain in upper positions once they are manually positioned. In other words, the trap, although heavier than the water it displaces, is buoyed upwardly by a force equal to the weight of the displaced water, and, because of the material used and the thickness of that material, this water buoyant force is sufficient to maintain the expanded shape of the trap.

Still another object of the invention is to provide a minnow trap having a tubular wall shape with water inlet openings and a minnow inlet opening, the minnow inlet opening also serving as a water outlet opening, wherein the size of the water inlet and outlet openings are such that the trap will not collapse when subjected to the variable pressures encountered in strong and changing river currents.

Another object of the invention is to provide a fish or minnow trap having collapsible walls to allow folding of the trap, but having walls that are, nevertheless, sufficiently rigid to maintain an expanded condition when the trap is used in still water.

Yet another object of the invention is to provide a minnow trap having a minnow inlet passage in the form of a funnel-like end wall with the funnel being invertible between positions of extension within and without the body of the trap. With this inversion feature, one position of the funnel provides minnows with a relatively easy path into the trap and a small, relatively inaccessible escape opening. In the other position of the funnel, the minnows can easily be poured from the trap. A subsidiary object is to provide such a trap with means for plugging the minnow passage so that water and minnows trapped within the minnow trap may be carried away from the body of water.

A further object of the invention is to provide a minnow trap with means for anchoring the trap so that the trap will automatically seek a position with the water inlet end upstream and the minnow inlet end downstream.

Other obejcts and advantages will appear to those skilled in the art.

In the drawings:

FIGURE 1 is a side elevation view of the minnow trap with parts shown in section;

FIGURE 2 is an elevation view of the inlet end of the minnow trap which is the end at the left side of FIGURE 1;

FIGURE 3 is an elevation view of the minnow inlet end of the trap which is the right side end of FIGURE 1;

FIGURE 4 is a view in section taken along the line 4—4 of FIGURE 1;

FIGURE 5 is an enlarged sectional view, partly broken away, taken along the line 6—6 of FIGURE 3;

FIGURE 6 is an enlarged sectional view, partly broken away, taken along line 6—6 of FIGURE 3;

FIGURE 7 is a side elevation view of the minnow trap in a typical folded condition; and FIGURE 8 is a side elevation view on a reduced scale, partly in section, showing the funnel-like end inverted and the corkplug in place for carrying the trap with water and minnows in it.

Referring now to the drawing, the minnow trap 10 is preferably of tubular shape, as illustrated, having a cylindrical side wall 11. While the cylindrical shape is preferable, and the cheapest form of construction, other shapes are possible. The side wall 11 is preferably formed of a flexible and bendable calendered plastic material. For a trap of about twenty inches in length and five inches in diameter, a vinyl plastic of 0.010 inch wall thickness has proved suitable for the wall 11.

The forward end of the trap 10 has a minnow inlet passage 12 in the form of a cone or funnel-like passage that is either formed integrally with the side wall 11, heat sealed thereto, or otherwise attached in any well-known manner. The funnel-like passage 12 is also formed of a flexible and bendable material, although it is not as flexible as the side wall 11 because the funnel-like passage 12 must maintain its own shape as well as the shape of the forward end of the side wall 11. A suitable thickness for the wall of the funnel-like passage is 0.020 inch. The passage 12 includes an opening 13 that is defined by a short sleeve extension 14. Also there is a cylindrical extension 15 adjacent the forward end of the side wall 11 that helps the cone 12 to maintain a cylindrical shape at the forward end of the side wall 11 as the side wall 11 bears against the cylindrical extension 15.

The rearward or water inlet end has a cover 16, and the cover 16 has a plurality of small holes 17 through it. The holes 17 are not large enough to permit minnows to pass through them. The cover 16 is cup-shaped with an annular flange 18 that is fastened to the end of the side wall 11. The end cover 16 also is stiffer than the side wall 11, the thickness of the end wall being about 0.040 inch. The fastening may be accomplished in any well known manner and, as illustrated, the side wall is folded over the annular flange 18 and is heat-sealed to it. The tubular side wall 11 and the perforated cover 16 could also be molded as a single unit.

There is an anchoring cord 19 attached to the water inlet end 16 of the trap 10. The anchoring cord 19 may be in the form of the loop illustrated in FIGURE 1, two separate cords, or a single cord 19, tied to the plate 16.

There is a cord stopper or plug 20 within the trap 10. A cord 21 is attached to the plug 20 and extends through the opening 13 and the funnel-shaped passage 12. The plug 20 may be easily drawn into a wedging position within the cylindrical opening 13 to operate as a water stopper. Otherwise the plug 20 lies within the trap 10 without obstructing the opening 13. A ball or other gate may replace the plug 20.

Whatever the form of the gate, it allows the trap to be used as a live bait box, as illustrated in FIGURE 8. To prepare the trap for use as a live bait container, the funnel-shaped passage 12 is inverted to extend outside the cylindrical body 11, and the plug 20 (or other gate) is wedged within the sleeve 14. In this condition of the trap, it can be carried about filled with water and with the minnows that have been trapped. When the cork 20 is pushed back inside the trap 10, the funnel-shaped passage 12, in the position illustrated in FIGURE 8, provides an easy passage for the pouring out of water and minnows.

The trap may also be used as a live bait container in the condition illustrated in FIGURE 5. With the funnel-shaped passage 12 extending within the body 11, removal of the plug or gate 20 and collapsing with one hand the wall 11 adjacent the sleeve opening 14 allows the removal into the other hand of single minnows. Thereafter, when the wall 11 is released and the plug 20 replaced, the water pressure within the trap will expand the wall 11 away from the funnel-shaped passage 12.

The invention has possible alternative constructions. The side wall 11, funnel-shaped passage 12 and imperforate cover 16 may be made of uniformly thin plastic. Such a trap will work well in still water, but may collapse in swift water under the differential pressures already discussed. Various means may be used to support the trap for use in swift water. Examples are thickened wall portions, spaced along the length of the trap to act as reinforcing ribs, and a compression spring within the trap and of the same diameter as the trap, the ends of the compression spring bearing against the ends of the trap. In both examples, strings or the like are connected between the perforated end and the sleeve extension 14 to hold the cover 12 within the body of the trap. The trap already described is preferable to these examples because it eliminates the strings, ribs and spring.

In using the trap, the cone 12 is first put in its position of extension within the tubular side 11, as illustrated in FIGURE 6. A suitable bait is placed within the trap by pouring the bait through the opening 13. The trap is then placed under water, and the water inlet end 16 is elevated somewhat to allow air to escape. Then the cord 19 is fastened at its free end to a stationary object beneath the surface of the water, or is anchored to the water floor by a rock or other weights.

In still water, the trap may not fully expand automatically because of the failure of water to flow into the trap. It can be expanded, however, if the sidewall 11 is manually pulled outward as the trap is slowly rotated. This will allow the trap to fill with water. Because the trap effectively loses its weight, or most of its weight, when submerged under water, it retains its expanded shape even in still water. In strong river currents, the trap will inflate itself if the water inlet end 16 is placed upstream and the minnow inlet 12 downstream, because the amount of water that can flow through the holes 17 is greater than the amount of water that can flow out of the smaller opening 13.

As for the size of the openings 17, compared to the size of the opening 13, the design takes into account the pressure drop across the end of the trap adjacent the funnel-shaped passage 12 as swift water currents flow past the trap. If the openings 17 were not sufficiently large in total area, this pressure drop past the downstream end of the trap would cause water to rush out of the trap and produce a pressure differential on opposite sides of the side wall 11 that would collapse the trap. However, the design of the trap 10 includes the provision of holes 17 of sufficient size and number that their total area is somewhat greater than the area of the opening 13, so that even with a low pressure condition adjacent the downstream end of the trap, no more water will flow out of the trap than can be supplied through the opening 17. Consequently, the side wall 11 will remain expanded.

Again referring to the use of the trap in swift water, the cup-shaped configuration of the upstream end 16, as provided by the annular flange 18, is purposely included to cup a certain amount of water that flows toward the end 16 of the trap. The cupped water increases the drag that the trap 11 places upon the cords 19, and this increased drag reduces the oscillation of the trap in changing water currents. Obviously, the greater the drag that the trap can impart to the anchoring cords, the greater and more sustained must be the side forces tending to shift the position of the trap. With the design of this trap, sudden and immediately changing river currents are less able to cause the trap to oscillate. At the same time, changing river currents of a sustained and more permanent nature will realign the trap to maintain the minnow inlet passage 12 in a downstream direction.

Returning to the description of the use of the trap, when the minnows are attracted by the bait within the trap, they can easily swim into the trap through the funnel-shaped passage 12. However, the opening 13, as defined by the cylindrical extension 14, presents a very small access by which the minnows can escape. Therefore the minnows frantically swim about in the trap, as they do in all minnow traps, doing barrel-rolls and bombarding the side walls of the trap in their attempts to escape. Since the trap is constructed of a soft plastic, and the side wall 11 is particularly soft and flexible, the bombardment by the minnows does much less harm than is the result when minnows swim at high speeds against an unyielding obstruction. Conventional minnow traps may result in the death of some of the minnows that are trapped before they can be removed from the trap.

The trap is easily removed from the water body with water and minnows still retained within the trap. This is accomplished by grasping the trap at its ends and raising it so that its center portion sags below the level of the openings 17 and the opening 13. The trap can also be removed from the water by first plugging the opening 14 and then lifting the trap from the water by its anchor string or by grasping the end of the body near the anchor string.

If the trap is lifted from the water with the cone end downwardly directed, the water pressure within the trap will collapse the funnel 12 and the sleeve 14.

When the trap is out of the water, the minnows can be poured from it by pressing the side wall 11 of the trap against the outer surface of the cylindrical extension 14. Then the minnows can be rather easily poured through the opening 14. Alternatively, the funnel-shaped passage 12 can be inverted to the position illustrated in FIGURE 8 in which position the minnows can be easily poured out.

The trap is normally transported or stored in a folded condition. An example of the folded condition is illustrated in FIGURE 7. The anchor cord 19 may be used to tie the folded trap, or it may simply be wadded up and carried in a coat pocket. The vinyl material used is highly resistant to cracking and tearing under repeated folding.

Various changes and modifications may be made within the process of this invention as will be readily apparent to those skilled in the art. Such changes and modifications are within the scope and teaching of this invention as defined by the claim appended hereto.

What is claimed is:

A minnow trap comprising a flexible, hollow body of pliable material having a hollow sleeve with a pair of spaced, opposed ends, one end defining a relatively stiff and rigid wall having water inlet perforations through it of insufficient size to permit the passage of minnows, the other end comprising a funnel-like minnow passage terminating in an opening of smaller size than the total area of the perforations, the water inlet wall being sufficiently rigid to maintain a substantially constant peripheral shape when subjected to water currents, the funnel-like minnow passage being formed of relatively stiff material for maintaining a substantially constant peripheral shape when subjected to water currents, the funnel-like minnow passage, nevertheless, being sufficiently pliable to permit manual inversion of it from a position of extension inward of the aforesaid other body end to a position of extension outward thereof, the hollow sleeve of the body being of thin foldable and bendable material to permit folding the trap into a compact flat package by collapsing opposite sides of the sleeve against one another to flatten all but the perforated wall and folding or rolling the flattened sleeve upon itself, the sleeve being sufficiently pliable to be readily unfoldable for expansion of the body.

References Cited in the file of this patent
UNITED STATES PATENTS

| | | |
|---|---|---|
| 951,656 | Newberry | Mar. 8, 1910 |
| 2,253,571 | Miller | Aug. 26, 1941 |
| 2,580,879 | Belokin | Jan. 1, 1952 |
| 2,688,817 | Brune | Sept. 14, 1954 |